United States Patent [19]
Yasuoka et al.

[11] Patent Number: 5,298,148
[45] Date of Patent: Mar. 29, 1994

[54] ELECTRODEPOSITION PAINT COMPOSITIONS

[75] Inventors: Yoshio Yasuoka, Fujisawa; Kazuyuki Morimoto, Nagoya; Masafumi Kume, Hiratsuka, all of Japan

[73] Assignee: Kansai Paint Co., Ltd., Hyogo, Japan

[21] Appl. No.: 21,528

[22] Filed: Feb. 23, 1993

[30] Foreign Application Priority Data

Feb. 28, 1992 [JP] Japan .................................. 75919

[51] Int. Cl.$^5$ .............................................. C25D 9/02
[52] U.S. Cl. ........................................ 205/50; 205/80; 205/317; 205/333; 106/1.05; 106/125; 106/14.34; 106/14.37; 106/14.39; 106/14.44; 428/423.1; 428/425.9
[58] Field of Search ............. 106/14.34, 14.37, 14.39, 106/14.44, 1.05, 1.25; 428/42.31, 425.9; 205/80, 316, 333, 50, 317

[56] References Cited

U.S. PATENT DOCUMENTS

| | | | |
|---|---|---|---|
| 4,002,481 | 1/1977 | McKaveney | 106/14.39 |
| 4,474,606 | 10/1984 | McKaveney et al. | 106/14.39 |
| 4,474,607 | 10/1984 | Goldie et al. | 106/14.44 |
| 4,488,578 | 12/1984 | Tseung et al. | 106/14.44 |
| 5,158,605 | 10/1992 | Kissel | 106/14.34 |

FOREIGN PATENT DOCUMENTS 3-7224 2/1991 Japan .

*Primary Examiner*—Anthony Green
*Attorney, Agent, or Firm*—Wenderoth, Lind & Ponack

[57] ABSTRACT

An electrodeposition paint composition which contains at least one lanthanum compound. When this composition is used, electrolytically deposited coating films exhibiting excellent corrosion resistance can be provided, without using rust inhibiting pigments such as of lead compounds or chromium compounds which are liable to cause environmental pollution.

15 Claims, No Drawings

ELECTRODEPOSITION PAINT COMPOSITIONS

The present invention relates to electrodeposition paint compositions which are capable of forming coating films excelling, in particular, in corrosion resistance.

Because electrodeposition paints can provide coating films of excellent throwing property, durability and corrosion resistance, they have been in wide use in the field of utility where such properties are required, for example, for coating automobiles and electric appliances.

With the view to further improve the corrosion resistance of the coating films, rust-preventive pigments comprising such lead or chromium compounds as lead chromate, basic lead silicate and strontium chromate, are frequently blended with electrodeposition paints. However, those compounds are highly toxic, and their use entails environmental pollution. For this reason, use of non-toxic or low toxic rust-preventive pigments in place of those lead or chromium compounds has been proposed (e.g., Japanese Patent Publication No. 7224/91), such non-toxic or low toxic pigments including zinc phosphate, iron phosphate, aluminum phosphate, calcium phosphate, zinc molybdate, calcium molybdate, zinc oxide, iron oxide, aluminum phosphomolybdate and zinc phosphomolybdate. Those compounds, however, do not exhibit rust-preventive action as strong as that of above-named lead or chromium compounds. Those zinc compounds, moreover, are apt to be unstable in electrodeposition baths. Thus, they are not practically satisfactory.

A main object of the present invention is to provide electrodeposition paint compositions free of such rust-preventive pigments which are liable to cause environmental pollution and yet exhibiting excellent corrosion resistance equal or superior to that of the electrodeposition paint compositions containing the lead or chromium compounds.

We have engaged in concentrative researches for a metallic compound which exhibits excellent anti-corrosive action equal or superior to that of the lead or chromium compounds, as blended with electrodeposition paint compositions, to discover that lanthanum compounds possess extremely high anti-corrosive action, and that electrodeposited coating films indeed excelling in corrosion resistance can be formed by blending them into electrodeposition paint compositions. The present invention is thus completed.

The present invention provides, accordingly, electrodeposition paint compositions comprising at least one lanthanum compound.

The lanthanum compounds that can be used in the present invention are organic or inorganic, water-soluble, difficultly water-soluble, or water-insoluble compounds which contain lanthanum as one of the components. Specific examples include organic acid salts of lanthanum such as lanthanum acetate, butyrate and oxalate; and inorganic lanthanum compounds such as lanthanum nitrate, hydroxide, oxide, and tungstate, etc. Of those, water-soluble lanthanum compounds such as organic acid salts of lanthanum are soluble in electrodeposition baths, and hence advantageously achieve the intended effect with the use of small amounts. In particular, lanthanum acetate is preferred.

The content of such lanthanum compounds in the electrodeposition paint compositions of the present invention is variable over a wide range, depending on the other components present in the compositions and intended use of individual compositions, while normally it ranges, in terms of the metal content based on the solid component of the paint, from 0.1 to 10%, preferably from 0.2 to 5%, inter alia, from 0.5 to 2%, the percentages being by weight.

The manner of adding the lanthanum compounds to the electrodeposition paint compositions is not critical. It can be effected in the manner similar to conventional pigment dispersion methods. For example, a lanthanum compound can be dispersed in a vehicle resin in advance to form a disperse paste, and the paste can be blended with an electrodeposition paint composition. In case of a water-soluble lanthanum compound, it can be blended as is, to a formulated resin emulsion for paint. As such vehicle resin, cationic resins are preferred, such as epoxy resins having tertiary amine-groups, acrylic resins having quaternary ammonium salt groups, epoxy resins having quaternary ammonium salt groups, etc.

Formulation of a disperse paste from a lanthanum compound and a vehicle resin can be conducted in the manner similar to preparation of a pigment disperse paste for blending pigments into ordinary electrodeposition paint compositions. More specifically, a lanthanum compound can be dispersed, for example, in a dispersing mixer such as a ball mill, together with a vehicle resin as above-named, to be made into a paste. In that occasion, other pigments or like additives may be dispersed together with the lanthanum compound.

Useful other pigments are subject to no critical limitation so long as they are normally used pigments for electrodeposition paint. For example, any of coloring pigments such as titanium oxide, carbon black and iron red; extender pigments such as clay, mica, baryta, talc, calcium carbonate and silica; and rust-preventive pigments such as aluminum phosphomolybdate and aluminum tripolyphosphate.

The electrodeposition paint compositions of the present invention may be anionic or cationic. Generally, however, cationic compositions are preferred from the standpoint of corrosion resistance. As the base resins to be contained in the compositions, any of epoxy, acrylic, polybutadiene, alkyd or polyester resins can be used, the most preferred being polyamine resins represented by amine-epoxy resin adducts.

Examples of amine-epoxy resin adducts include:

(i) adducts of polyepoxide compounds with primary mono- and poly-amines, secondary mono- and poly-amines, or mixtures of primary and secondary polyamines (cf. for example, U.S. Pat. No. 3,984,299);

(ii) adducts of polyepoxide compounds with secondary mono- and polyamines having ketiminized primary amino groups (cf. for example, U.S. Pat. No. 4,017,438); and (iii) the reaction products obtained upon etherification of polyepoxide compounds and hydroxy compounds having ketiminized primary amino groups (cf. for example, Japanese Laid-Open patent publication, Kokai No. 43013/84)

The polyepoxide compounds to be used for forming the amine-epoxy resin adducts have at least two epoxy groups per molecule. Speaking in general terms, those polyepoxide compounds having a number average molecular weight of at least 200, preferably from 400 to 4,000, more preferably from 800 to 2000, are suitable for the intended use. In particular, those formed through reaction of polyphenol compounds with epichlorohydrin are conveniently used.

Examples of the polyphenol compounds useful for forming the polyepoxide compounds include bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulphone, phenol novolac and cresol novolac.

The polyepoxide compounds may be those which have partially reacted with polyols, polyether polyols, polyester polyols, polyamideamines, polycarboxylic acids or polyisocyanate compounds, or may be those to which ε-caprolactone, an acrylic monomer or the like has been graft-polymerized.

Said base resins may be externally crosslinking (i.e., crosslinkable under addition of a curing agent) or internally (or self) crosslinking. As the curing agents to be used with externally crosslinking resins, known crosslinking agents such as (blocked) polyisocyanate compounds and amino resins are usable, in particular, blocked polyisocyanate compounds being preferred. Also as the internally crosslinking resins, those into whose molecules blocked isocyanate groups have been introduced are conveniently used.

The blocked polyisocyanate compound, which is useful as the curing agent of said externally crosslinking resins, can be a product of an addition reaction between each approximately theoretical amount of a polyisocyanate compound and an isocyanate blocking agent. Examples of the polyisocyanate compound include aromatic, alicyclic or aliphatic polyisocyanate compounds such as tolylene diisocyanate, xylylene diisocyanate, phenylene diisocyanate, bis(isocyanatemethyl)cyclohexane, tetramethylene diisocyanate, hexamethylene diisocyanate, methylene diisocyanate and isophorone diisocyanate; and terminal isocyanate group-containing compounds which are obtained by a reaction between an excess amount of these isocyanate compounds with low molecular, active hydrogen-containing compounds such as ethylene glycol, propylene glycol, trimethylolpropane, hexanetriol, castor oil and the like.

Said isocyanate blocking agent is to block isocyanate groups in a polyisocyanate compound as added thereto. A desirable blocked isocyanate compound formed upon the addition is stable under room temperature but can regenerate free isocyanate groups by dissociating the blocked isocyanate compound when heated to about 100°–200° C. As the blocking agents which satisfy such requirements, for example, lactam compounds such as ε-caprolactam and γ-butyrolactam; oxime compounds such as methyl ethyl ketoxime and cyclohexanoneoxime; phenolic compounds such as phenol, para-t-butylphenol and cresol; aliphatic alcohols such as n-butanol and 2-ethylhexanol; aromatic alkylalcohols such as phenylcarbinol and methylphenylcarbinol; and ether alcoholic compounds such as ethylene glycol monobutylether, etc. may be named. Of those, oxime- and lactam-type blocking agents are particularly preferred in respect of curability of electrodeposition paint compositions, because they remove at relatively low temperatures.

In the procedure for making a self-crosslinkable base resin having blocked isocyanate groups within its molecules, blocked isocyanate groups can be introduced into the base resin in conventionally practiced manner. For example, the introduction can be effected by reacting the free isocyanate groups in a partially blocked polyisocyanate compound with the active hydrogen-containing moiety of the base resin.

In order to render the base resins water-soluble or water-dispersible, cationic resins are normally neutralized with water-soluble organic acids such as formic acid, acetic acid and butyric acid. In case of anionic resins, they are neutralized with alkalies such as amines and alkali metal hydroxides, instead of above water-soluble organic acids.

If necessary, other paint additives such as organic solvents, pigment-dispersing agents, coated surface-adjusting agents and the like may be blended with the electrodeposition paint compositions of the present invention.

Furthermore, the compositions may be blended with organotin compounds as the curing catalyst, if the occasion demands. As examples of such organotin compounds, organotin oxides such as dibutyltin oxide and dioctyltin oxide, and alkyltin compounds of aliphatic or aromatic carboxylic acids such as dibutyltin dilaurate, dioctyltin dilaurate, dibutyltin diacetate, bis(dioctyl benzoyloxytin)oxide, bis(dibutyl benzoyloxytin)oxide, dioctyltin dibenzoate, dibutyltin dibenzoate and the like can be named. The amount of such an organotin compounds to be blended an the blending method can follow the conventional practice.

The electrodeposition paint compositions of the present invention can be applied onto the surfaces of desired substrate by means of electrolytic deposition. In general terms the electrodeposition is conducted by the steps of diluting a composition of the present invention with, for example, deionized water, to a solid concentration of about 5–40% by weight, adjusting the pH of the system within a range of 5.5–9.0 to form an electrodeposition bath, and conducting the electrodeposition at a bath temperature adjusted to 15°–35° C., under a load voltage of 100–400 V.

The thickness of electrodeposited coating film formable with a composition of the present invention is subject to no critical limitation. Normally, however, that of a cured coating film preferably is within a range of 10–40 μm. The adequate baking curing temperature of the coating film normally ranges from 100° to 200° C., preferably from 120° to 190° C.

According to the above-described present invention, electrodeposition paint compositions which are free of such rust inhibiting pigments that are liable to cause environmental pollution, e.g., lead or chromium compounds, and yet capable of giving electrodeposited coating films exhibiting excellent rust inhibiting property equal or superior to that of the compositions containing such undesirable pigments are provided, by blending lanthanum compounds into the electrodeposition paint compositions.

The reason for such excellent anti-corrosive effect derived by the electrodeposition paint compositions of the present invention is not yet fully clear, but it is presumed to be due to a certain desirable action performed by the lanthanum compound at the intersurface with the coated article. Furthermore, when the compositions of the invention are those which are cured by blocked isocyanate, increase in curability of the electrodeposited film is observed. This is inferred to be attributable to the action of the lanthanum compounds also as a dissociation catalyst for blocked isocyanate, which contributes to improvements in physical properties of the coating films under low temperature curing.

The present invention is explained more specifically hereinafter, with reference to working examples, it being understood that the invention is in no way limited thereby. In the following Examples, parts and percentages are by weight.

Preparation of pigment pastes

The components indicated in the following Table 1 were fed into a ball mill and each dispersed for 40 hours, to provide pigment pastes which were labeled as Blends 1 to 7.

TABLE 1

| | Example | | | | | Comparative Example | |
|---|---|---|---|---|---|---|---|
| Pigment paste No. | 1 Blend 1 | 2 Blend 2 | 3 Blend 3 | 4 Blend 4 | 5 Blend 5 | 1 Blend 6 | 2 Blend 7 |
| Blended Components | | | | | | | |
| epoxy resin having quaternary ammonium salt groups | 5 | 5 | 5 | 5 | 5 | 5 | 5 |
| lanthanum acetate | 2 | | | | 2 | | |
| lanthanum oxalate | | 2 | | | | | |
| lanthanum oxide | | | 2 | | | | |
| titanium oxide | | 14 | | 14 | 14 | 14 | 14 |
| refined clay | 10 | | 10 | | | | |
| Carbon Black | 1 | 1 | 1 | 1 | 1 | 1 | 1 |
| basic lead silicate | | | | | | | 1 |
| dioctyltin oxide | 3 | 3 | 3 | 3 | | 3 | 3 |
| deionized water | 15.3 | 31.3 | 15.3 | 23.3 | 19.3 | 23.3 | 27.3 |

EXAMPLE 1

An amine-epoxy resin adduct having an amine value of 47 was prepared by dissolving 1900 parts of Epon 1004(*1) in 1012 parts of butyl cellosolve, adding 124 parts of diethylamine thereto dropwise, and thereafter maintaining the system at 120° C. for 2 hours.

Separately, 1000 parts of a dimer acid type polyamide resin [tradename: Versamide 460, manufactured by Henkel Hakusui Co., Ltd.] was dissolved in 429 parts of methyl isobutyl ketone, heated to 130°-150° C. under reflux, and the formed water was distilled off. Thus the terminal amino groups of the amide resin were converted to ketimin. The system was maintained at 150° C. for approximately 3 hours. After distillation of water stopped, the system was cooled to 60° C., and subsequently added to the above-obtained amine-epoxy resin adduct, followed by heating to 100° C. After being maintained at 100° C. for an hour, the system was cooled to room temperature to provide a varnish of an epoxy resin-aminopolyamide addition resin of a solid content 68% and amine value 65.

Thus obtained varnish 103 parts (70 parts as solid resin) were blended with 30 parts (as solid) of xylylene diisocyanate blocked with 2-ethylhexyl alcohol, and 15 parts of 10% acetic acid, and stirred to homogeneity. Then 150 parts of deionized water was added to the system dropwise under vigorous agitation, consuming about 15 minutes, to provide a cationic electrodeposition clear emulsion with a solid content of 33.6%. To 298 parts of this clear emulsion, 36.3 parts of the pigment paste of the receipe shown in Blend 1 in Table 1 was added under agitation. Diluting the system with 271.3 parts of deionized water, a cationic electrodeposition paint was obtained.

(*1) Epon 1004: a bisphenol A type epoxy resin having an epoxy equivalent of about 950, manufactured by Yuka Shell Epoxy K.K.

EXAMPLES 2 AND 3 AND COMPARATIVE EXAMPLES 1 AND 2

Example 1 was repeated except that the Blend 1 pigment paste used in Example 1 was replaced in each run by the pigment pastes of the recipes for Blends 2, 3, 6 and 7 as shown in Table 1, respectively, to produce the cationic electrodeposition paints indicated in the same Table 1.

EXAMPLE 4

Example 1 was repeated except that 10 parts (1 part as solid component) of a 10% aqueous solution of lanthanum acetate was added to the homogeneously stirred vehicle component, etc., at the time of preparing the clear emulsion, and that Blend 1 pigment paste was replaced by the Blend 4 pigment paste as shown in Table 1, to provide a cationic electrodeposition paint.

EXAMPLE 5

Example 1 was repeated except that 2 parts of dioctyltin dibenzoate was added to the system at the time of preparing the clear emulsion, and that the Blend 1 pigment paste was replaced by Blend 5 pigment paste as shown in Table 1, to provide a cationic electrodeposition paint.

Coating Test

In each of the cationic electrodeposition paints obtained in Examples 1-5 and Comparative Examples 1-2, a 0.8×150×70 mm—sized cold-rolled dull finish steel plate, which had been treated with Palbond #3030 (a zinc phosphate treating agent, manufactured by Nihon Parkerizing Co., Ltd.), was immersed. Electrodeposition was conducted with each of the paints at a voltage of 300 V, using the steel plate as the cathode. An electrodeposition coating film of approximately 20 μm in thickness in thickness (based on dry film thickness) was formed in each run, which was washed with water and baked. The baking was conducted at four-levels of ambient temperatures, for a baking time of 20 minutes each, using an electric hot air current dryer. The results of performance tests of the resultant coated plates are shown in Table 2 below.

TABLE 2

| | | Baking Temp. | | | |
|---|---|---|---|---|---|
| Test Item | Example No. | 140° C. | 150° C. | 160° C. | 170° C. |
| (*2) Corrosion Resistance | Example 1 | ○ | ⊚ | ⊚ | ⊚ |
| | Example 2 | ○ | ○ | ⊚ | ⊚ |
| | Example 3 | ○ | ○ | ⊚ | ⊚ |

TABLE 2-continued

| Test Item | Example No. | Baking Temp. | | | |
|---|---|---|---|---|---|
| | | 140° C. | 150° C. | 160° C. | 170° C. |
| | Example 4 | ○ | ⊚ | ⊚ | ⊚ |
| | Example 5 | ○ | ⊚ | ⊚ | ⊚ |
| | Comparative Example 1 | x | Δ | Δ | ○ |
| | Comparative Example 2 | ○ | ⊚ | ⊚ | ⊚ |
| (*3) Curability | Example 1 | ○ | ○ | ○ | ○ |
| | Example 2 | ○ | ○ | ○ | ○ |
| | Example 3 | ○ | ○ | ○ | ○ |
| | Example 4 | ○ | ○ | ○ | ○ |
| | Example 5 | ○ | ○ | ○ | ○ |
| | Comparative Example 1 | x | Δ | ○ | ○ |
| | Comparative Example 2 | Δ | ○ | ○ | ○ |
| (*4) Impact Resistance | Example 1 | ○ | ○ | ○ | ○ |
| | Example 2 | ○ | ○ | ○ | ○ |
| | Example 3 | ○ | ○ | ○ | ○ |
| | Example 4 | ○ | ○ | ○ | ○ |
| | Example 5 | ○ | ○ | ○ | ○ |
| | Comparative Example 1 | x | x | ○ | ○ |
| | Comparative Example 2 | Δ | ○ | ○ | ○ |
| (*5) Three-Coat Clarity | Example 1 | ○ | ⊚ | ⊚ | ⊚ |
| | Example 2 | ○ | ⊚ | ⊚ | ⊚ |
| | Example 3 | ○ | ⊚ | ⊚ | ⊚ |
| | Example 4 | ○ | ⊚ | ⊚ | ⊚ |
| | Example 5 | ○ | ○ | ⊚ | ⊚ |
| | Comparative Example 1 | x | x | ○ | ⊚ |
| | Comparative Example 2 | Δ | ○ | ⊚ | ⊚ |

The performance tests were conducted by the following methods.

(*2) Corrosion resistance

The electrodeposited coating was cross-cut with a knife penetrating to the substrate, and subjected to a salt spray test for 840 hours in accordance with JIS Z2371. The evaluation was made based on the widths of the rust and blister which developed from the cut with the knife, in four-level grading system as follows.

⊚: The maximum width of rust or blister is less than 1 mm (one side) as measured from the cut portion.

○: The maximum width of rust or blister is 1 mm or more but less than 2 mm (one side) as measured from the cut portion.

Δ: The maximum width of rust or blister is 2 mm or more but less than 3 mm (one side) as measured from the cut portion, and blisters are conspicuous on the flat portion.

x: The maximum width of rust or blister is 3 mm or more as measured from the cut portion, and blisters are developed on the whole area of the coated surface.

(*3) Curability

The surface of each of the electrodeposition coated plates was rubbed with four sheets of gauze cloth overlayed on one another and impregnated with methyl isobutyl ketone, at a pressure of about 4 kg/cm² over a length of about 3-4 cm, 20 reciprocal times. Then the appearance of the coated surface was visually evaluated in three levels as follows.

○: No flaw is observed on the coated surface.

Δ: A little flaw is observed on the coated surface but the substrate is still invisible.

x : The coated surface is dissolved and the substrate is visible.

(*4) Impact resistance

The test was conducted using a Du Pont's Impact Tester under the following conditions: the diameter of the impact center, ½ inch; dropping distance of the weight, 50 cm; and the measuring atmosphere, 20° C. The portion dented under the impact was graded by visual observation as follows.

○: No abnormality.

Δ: A few, fine cracks are observed.

x : Large cracks are observed.

(*5) Three-Coat Clarity

Onto a surface of each of the electrodeposition coated plates, Amilac TP-37 Gray (an aminoalkyd intermediate coating paint manufactured by Kansai Paint Co., Ltd.) was applied by means of spray coating to a dry coating film thickness of about 35 μm, followed by 20 minutes' baking at 140° C. Further onto the same surface Amilac TM13 White (an aminoalkyd top coating paint manufactured by Kansai Paint Co., Ltd.) was applied by spray coating to a dry coating film thickness of about 35 μm, followed by 20 minutes' baking at 140° C. The clarity of so 3-coated surfaces was evaluated using an Image Clarity Meter manufactured by Suga Tester K.K.

⊚: Measured value of 80 or higher

○: Measured value of 75 to less than 80

Δ: Measured value of 70 to less than 75 x: Measured value of less than 70

What is claimed is:

1. A cationic electrodeposition paint composition comprising a polyamine, resin, a blocked polyisocyanate compound, and a lanthanum compound selected from the group consisting of lanthanum acetate, lanthanum butyrate, lanthanum oxalate, lanthanum nitrate, lanthanum hydroxide, lanthanum oxide and lanthanum tungstate, said lanthanum compound being present in an amount ranging from 0.1 to 10% by weight in terms of metal content, based on the solid content of the paint composition.

2. The composition as defined in claim 1, in which the lanthanum compound is lanthanum acetate.

3. The composition as defined in claim 1, which contains the lanthanum compound in an amount ranging from 0.5 to 2% by weight in terms of the metal content based on the solid content of the paint.

4. The composition as defined in claim 1, in which the polyamine resin is an amine-epoxy resin adduct.

5. The composition as defined in claim 1, which further comprises an organotin compound as a curing catalyst.

6. An electrodeposition bath containing the composition as defined in claim 1.

7. A coated article on which the composition as defined in claim 1 is electrolytically deposited.

8. An electrodeposition coating method for the coating of a substrate surface, which comprises diluting a composition as defined in claim 1 with deionized water to a solid content of 5-40% by weight, adjusting the pH of the system within a range of 5.5-9.0 to form an electrodeposition bath, and conducting the electrodeposition at a bath temperature adjusted to 15°-35° C. under a load voltage of 100-400 V.

9. A cationic electrodeposition paint composition comprising a self-crosslinkable polyamine resin containing blocked isocyanate groups, and a lanthanum compound selected from the group consisting of lanthanum acetate, lanthanum butyrate, lanthanum oxalate, lanthanum nitrate, lanthanum hydroxide, lanthanum oxide and lanthanum tungstate, said lanthanum compound being present in an amount ranging from 0.1 to 10% by weight in terms of metal content, based on the solid content of the paint composition.

10. A composition as defined in claim 9, which further comprises an organotin compound as a curing catalyst.

11. The composition as defined in claim 9, in which the lanthanum compound is lanthanum acetate.

12. The composition as defined in claim 9, which contains the lanthanum compound in an amount ranging from 0.5 to 2% by weight in terms of the metal contents based on the solid content of the paint composition.

13. The composition as defined in claim 9, in which the polyamine resin is an amine-epoxy resin adduct.

14. The composition as defined in claim 9, in which the polyamine resin is obtained by reacting a free isocyanate group in a partially blocked polyisocyanate compound with an active hydrogen-containing moiety of a polyamine resin.

15. An electrodeposition coating method for the coating of a substrate surface, which comprises diluting a composition as defined in claim 9 with deionized water to a solid content of 5–40% by weight, adjusting the pH of the system within a range of 5.5–9.0 to form an electrodeposition bath, and conducting the electrodeposition at a bath temperature adjusted to 15°–35° C., under a load voltage of 100–400 V.

* * * * *